United States Patent
Obliger et al.

(10) Patent No.: US 12,042,082 B2
(45) Date of Patent: Jul. 23, 2024

(54) BEVERAGE MACHINE WITH A NON-HOMOGENEOUS INGREDIENT EXTRACTION CONFIGURATION

(71) Applicant: SOCIETE DES PRODUITS NESTLE S.A., Vevey (CH)

(72) Inventors: Nicolas Obliger, Franey (FR); Marco Magatti, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/980,019

(22) PCT Filed: Mar. 13, 2019

(86) PCT No.: PCT/EP2019/056262
§ 371 (c)(1),
(2) Date: Sep. 11, 2020

(87) PCT Pub. No.: WO2019/175227
PCT Pub. Date: Sep. 19, 2019

(65) Prior Publication Data
US 2021/0000287 A1    Jan. 7, 2021

(30) Foreign Application Priority Data

Mar. 14, 2018  (EP) ..................................... 18161841
Dec. 20, 2018  (EP) ..................................... 18214451
(Continued)

(51) Int. Cl.
*A47J 31/36* (2006.01)
*A47J 31/06* (2006.01)
*A47J 31/40* (2006.01)

(52) U.S. Cl.
CPC ....... *A47J 31/3628* (2013.01); *A47J 31/0642* (2013.01); *A47J 31/0673* (2013.01);
(Continued)

(58) Field of Classification Search
CPC .. A47J 31/3628; A47J 31/0673; A47J 31/407; A47J 31/3633; B65D 85/804–8067
See application file for complete search history.

(56) References Cited

U.S. PATENT DOCUMENTS 3,420,675 A  *  1/1969  Costas ............... B65D 85/8043
                                                              426/77
4,136,202 A      1/1979  Favre
(Continued)

FOREIGN PATENT DOCUMENTS

CH           99932       6/1923
CN        1633252 A      6/2005
(Continued)

OTHER PUBLICATIONS

China Patent Office Communication for Application No. 201980014871.X, dated Feb. 24, 2022, 26 pages.
(Continued)

*Primary Examiner* — Viren A Thakur
*Assistant Examiner* — Chaim A Smith
(74) *Attorney, Agent, or Firm* — K&L Gates LLP (57) ABSTRACT

A machine (1) for preparing a beverage (110) from an ingredient (102) has an extraction unit (2) with: an ingredient extraction seat (20); an inlet arrangement (21) for guiding water into the seat (20); and a dispensing arrangement (22) for guiding beverage (110) out of the seat (20). The dispensing arrangement (22) has a face (220) delimiting a downstream part of the seat (20). The face (220) is made of an upper portion (220*a*) and a lower portion (220*b*) that are delimited by a substantially horizontal physical or notional delimitation line (220*c*) that is located between a top end and a bottom end of the face (220). The upper portion (220*a*) is nude of an upper outflow passage (222*a*) and an upper impervious part delimiting the upper outflow passage. The upper portion (220*a*) has an upper surface area ratio transverse to a direction (200) of downstream flow in the seat (20) of: a surface area of the upper outflow passage (222*a*) over a surface area of the upper impervious part. The lower portion (220*b*) is made of a lower outflow passage
(Continued)

(222b) and a lower impervious part delimiting the lower outflow passage. The lower portion (220b) has a lower surface area ratio transverse to the downstream flow direction (200) of: a surface area of the lower outflow passage (222b) over a surface area of the lower impervious part. The face (220) has an overall ratio of the upper surface area ratio over the lower surface area ratio that is greater or smaller than 1.

10 Claims, 6 Drawing Sheets

(30) Foreign Application Priority Data

| Dec. 20, 2018 | (EP) | 18214459 |
|---|---|---|
| Dec. 20, 2018 | (EP) | 18214470 |
| Dec. 20, 2018 | (EP) | 18214475 |
| Dec. 20, 2018 | (EP) | 18214480 |

(52) U.S. Cl.
CPC .......... *A47J 31/407* (2013.01); *A47J 31/3633* (2013.01); *A47J 31/3695* (2013.01)

(56) References Cited

U.S. PATENT DOCUMENTS

| 4,921,712 | A | * | 5/1990 | Malmquist | A47J 31/0642 |
|---|---|---|---|---|---|
| | | | | | 426/112 |
| 2010/0108541 | A1 | | 5/2010 | Roberto | |
| 2011/0297005 | A1 | * | 12/2011 | Mariller | A47J 31/0673 |
| | | | | | 99/289 P |
| 2015/0056343 | A1 | | 2/2015 | Mori et al. | |
| 2017/0135516 | A1 | | 5/2017 | Fantappie | |
| 2017/0347825 | A1 | * | 12/2017 | Walter | B65D 85/8061 |
| 2020/0405090 | A1 | * | 12/2020 | Remo | A47J 31/3623 |

FOREIGN PATENT DOCUMENTS

| CN | 101686769 | A | 3/2010 |
|---|---|---|---|
| CN | 101862123 | A | 10/2010 |
| CN | 102574633 | A | 7/2012 |
| CN | 103458748 | A | 12/2013 |
| CN | 104586261 | A | 5/2015 |
| CN | 104602576 | A | 5/2015 |
| CN | 205458119 | U | 8/2016 |
| EP | 2335529 | A1 | 6/2011 |
| EP | 2364930 | A2 | 9/2011 |
| JP | 5940137 | B1 | 6/2016 |
| KR | 101469228 | B1 | 12/2014 |
| NL | 7706110 | A | 12/1978 |
| RU | 2526212 | C2 | 8/2014 |
| WO | 2009013777 | A1 | 1/2009 |
| WO | 2013114294 | | 8/2013 |
| WO | 2016071794 | | 5/2016 |

OTHER PUBLICATIONS

Russian Office Action for Appl No. 2020133043 dated Jul. 12, 2022.
India Patent Office Communication for Application No. 202017030409, dated Apr. 29, 2022, 6 pages.

* cited by examiner

BEVERAGE MACHINE WITH A NON-HOMOGENEOUS INGREDIENT EXTRACTION CONFIGURATION

CROSS REFERENCE TO RELATED APPLICATIONS

The present application is a National Stage of International Application No. PCT/EP2019/056262, filed on Mar. 13, 2019, which claims priority to European Patent Application No. 18161841.4, filed on Mar. 14, 2018, European Patent Application No. 18214480.8, filed Dec. 20, 2018, European Patent Application No. 18214451.9, filed Dec. 20, 2018, European Patent Application No. 18214459.2, filed Dec. 20, 2018, European Patent Application No. 18214470.9, filed Dec. 20, 2018, and European Patent Application No. 18214475.8, filed Dec. 20, 2018, the entire contents of which are being incorporated herein by reference.

FIELD OF THE INVENTION

The field of the invention pertains to beverage preparation machines provided with a particular extraction arrangement, e.g. machines using capsules of an ingredient of the beverage to be prepared.

For the purpose of the present description, a "beverage" is meant to include any human-consumable liquid substance, such as tea, coffee, hot or cold chocolate, milk, soup, baby food, etc. . . . . . A "capsule" is meant to include any pre-portioned beverage ingredient, such as a flavoring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BACKGROUND ART

The preparation of beverage by extraction of an extractible ingredient, such as a brewable ingredient e.g. roast-and-ground coffee and/or tea, in particular contained in a portioned container such as a capsule, a pod or a sachet, is well known.

EP0512468 relates to a capsule with a cup-shaped body and a tearable beverage outlet membrane. The membrane is generally a thin aluminium membrane that tears against a tearing extraction plate of a beverage extracting device such as described in EP0512470.

EP0512470 relates to a system for extracting a coffee using a beverage extraction unit with a tearing extraction plate comprising multiple raised elements and channels in-between (called a "flow grille and relief surface element") which is adapted to receive a sealed capsule, to introduce water under pressure via a water injector into the capsule, to deform the outlet membrane or cover (e.g. an aluminium membrane) and to tear it under the effect of pressure of the liquid rising in the capsule to allow the beverage to be released from the capsule.

EP0602203 relates to a sealed flexible sachet in the form of an individual portion adapted to be extracted under pressure containing at least one powdered substance for the preparation of a beverage such as roast-and-ground coffee; the sachet comprising two identical flexible sheets of circular, oval or polygonal shape, which provide between one another a space for the substance and are sealed over their periphery so that the sachet is substantially symmetrical with respect to its plane of sealing, the sachet being opened under the effect of the increase in pressure in the sachet when the extraction fluid is injected.

EP0870457 relates to an extraction unit similar to as EP0512470, but adapted for a closed impermeable sachet containing coffee substance such as described in EP0602203. The device comprises an upper member comprising means intended to perforate the upper surface of the sachet and permit introduction of water into the sachet, a lower member which has a receptacle for accommodation of the capsule and raised and hollow portions; wherein the extraction surface of the sachet is drawn progressively and locally against the raised and hollow portions; the extraction surface tearing in multiple locations according to a path which is predetermined by the location of the raised and hollow portions and reaching its rupture tension there, in order to permit the flow of the liquid after extraction. The lower portion generally comprises flow apertures to permit the beverage to flow there-through. The raised and hollow portions are preferably under the form of truncated pyramids separated by a network of channels.

Hence, handy prior art beverage extraction systems utilize an exchangeable capsule, e.g. rigid capsule, sachet or flexible pod, comprising a tearable beverage outlet membrane, e.g. a thin aluminium foil, which can be torn only when a sufficient deformation of this membrane has occured against the raised elements of the tearing plate. The tearing generally occurs at the edges of the raised elements which are generally multiple small truncated pyramids or rectilinear ridges. The tearing results in the creation of small orifices along the edges of these raised elements. These orifices are relatively small (e.g. 0.1-1.0 mm long and 0.1-0.3 mm wide) and generally the outlet membrane at least partially conforms to the top and upper side of the raised elements so reducing even more the flow opening area. As a result, the pressure drop is relatively high at this interface. Furthermore, filtering of the coffee particle occurs at this confined interface which is an advantage since no additional filter is necessary inside the capsule. This geometry of extraction therefore corresponds to what can be generally called a geometry of an extraction plate with raised elements in the present application. The flow of beverage is then collected in the channels and drained through small openings of well-defined dimensions in the channels.

In the known system of the prior art, the flow rate and pressure are dictated by the intrinsic properties of the capsule and by the performance of the pump.

The backpressure highly depends on the degree of compaction of the ground coffee in the capsule. For a same coffee blend, the variability of pressure can be very high. In particular, for certain coffee blends, in particular, in the low particle size, the pressure may vary from 5 to 15 bar.

Whereas the ingredient extraction space, e.g. with a capsule and/or an extraction chamber is usually symmetrical along the general flow direction, enabling easy handling of the ingredient, it may be advantageous to obtain a directed flow path at extraction that is such as to obtain or increase or reduce certain extraction effects, e.g. crema formation or intensity of the extraction.

SUMMARY OF THE INVENTION

The invention relates to a machine for preparing a beverage. The beverage preparation machine can be an in-home or out of home machine. The machine may be for the preparation of coffee, tea, chocolate, cacao, milk, soup, baby food, etc. . . . . .

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluent liquid, e.g. water, may be mixed with such ingredient to form the beverage.

Typically, a predetermined amount of beverage is formed and dispensed on user-request, which corresponds to a portion (e.g. a serving). The volume of such portion may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. . . . . . In particular, a coffee machine may be configured for dispensing espressos, e.g. an adjustable volume of 20 to 60 ml per portion, and/or for dispensing lungos, e.g. a volume in the range of 70 to 150 ml per portion.

The invention relates to a machine for preparing a beverage from an ingredient. The machine includes an extraction unit.

The extraction unit has an ingredient extraction seat, such as a seat delimiting an ingredient chamber and/or a seat for receiving an ingredient supplied within a capsule into the seat. A suitable capsule seat may be in the shape of a capsule chamber.

Thus, in one possible embodiment, the beverage may be prepared from a capsule containing the ingredient of the beverage. The capsule can be of the type described above under the title "Field of the Invention" and/or the capsule may include an ingredient described under the same title.

The capsule can comprise a capsule body, e.g. a generally straight or tapered body. The capsule can have a circular peripheral annulus flange, e.g. a flexible or rigid flange, extending from a peripheral part, e.g. an edge or face, of the capsule body. The capsule may be provided with an outlet membrane. The capsule may contain a flavoring ingredient for preparing tea, coffee, hot chocolate, cold chocolate, milk, soup or baby food.

Examples of ingredient extraction seats, e.g. extraction chambers, are disclosed in EP 1767129, WO 2012/025258, WO 2012/025259, WO 2013/127476, WO 2014/056641, WO 2014/096122, WO 2014/096123, WO 2015/155144 and WO 2015/155145.

The extraction unit, e.g. the seat, may be configured to extract an ingredient that is not supplied within a capsule into the seat, e.g. a loosely supplied ingredient or a capsule-free agglomerated or compacted ingredient.

The extraction unit has an inlet arrangement for guiding water into the seat and a dispensing arrangement for guiding beverage out of the seat. The dispensing arrangement has a face delimiting a downstream part of the seat.

The face is made of an upper portion and a lower portion, which portions are delimited by a substantially horizontal physical or notional delimitation line that is located between a top end and a bottom end of the face. Typically, such portions are substantially flush. For instance, the portions extend in the same plane or are substantially parallel and slightly offset, e.g. by a distance that does not exceed 2 or 3 or 4 mm.

The face may be implemented in the dispensing arrangement with the delimitation line in its horizontal orientation or in a different orientation, i.e. at an angle to the horizontal, with reference to the machine in its beverage dispensing orientation. Likewise, the face may be implemented in the dispensing arrangement with its upper portion on top and its lower portion on the bottom or upside down or at an angle, with reference to the machine in its beverage dispensing orientation.

The upper portion is made of an upper outflow passage and an upper impervious part delimiting the upper outflow passage. The upper portion has an upper surface area ratio transverse to a direction of downstream flow in the seat of: a surface area of the upper outflow passage over a surface area of the upper impervious part. This upper surface area ratio defines an upper permeability value of the upper portion.

The lower portion is made of a lower outflow passage and a lower impervious part delimiting the lower outflow passage. The lower portion has a lower surface area ratio transverse to the downstream flow direction of: a surface area of the lower outflow passage over a surface area of the lower impervious part. This lower surface area ratio defines a lower permeability value of the lower portion.

The upper and lower permeability values may each range from about 0 to infinite.

The upper and lower outflow passages are typically configured to guide beverage towards a beverage dispensing area.

The machine may have a drop stop arrangement between the (upper and lower) outflow passages and the beverage dispensing area. Examples of drop stops are disclosed in WO 2006/050769, WO 2012/072758, WO 2013/127907, WO 2016/050657, WO 2016/083488, WO 2018/069266 and EP2017208722.3.

The dispensing area may be delimited by a support for supporting a user-recipient, e.g. a cup or mug. For instance, the support is a support device that is connected an outside machine housing and/or a machine frame, or the support device is external to such machine, for example the machine itself is placed for dispensing the beverage. Typically, the external support device has a generally horizontal surface for placing such machine, the device being for instance a table or a shelf.

The user-recipient support can be: associated with a drip tray e.g. a drip tray supporting the support; and/or movable relative to the housing vertically under the outlet and/or away from under a dispensing outlet for enabling a placement of user-recipients of different heights under the outlet.

Examples of suitable recipient supports are disclosed in EP 0 549 887, EP 1 440 639, EP 1 731 065, EP 1 867 260, U.S. Pat. Nos. 5,161,455, 5,353,692, WO 2009/074557, WO 2009/074559, WO 2009/135869, WO 2011/154492, WO 2012/007313, WO 2013/186339, EP 2014198710, EP 2014198712 and EP 2014198715.

The face has an overall ratio of the upper surface area ratio (e.g. the upper permeability value) over the lower surface area ratio (e.g. the lower permeability value) that is greater or smaller than 1, such as greater than 3 or smaller than 0.3, for instance greater than 10 or smaller than 0.1, e.g. greater than 100 or smaller than 0.01.

When the permeability value on the top part of the face is greater than the permeability value on the bottom part of face, a flow of water is favoured on the upper part of the seat. If the seat is only partly filled with ingredient, e.g. when a capsule is used that is partly filled, then part of the water flowing through the seat is not or only poorly exposed to the ingredient contained in the seat. Hence, the resulting beverage is less concentrated. Moreover, when the extraction is an infusion process, e.g. of tea or coffee, then the dilution of the beverage does not require a depletion (over-extraction) of the ingredient with the possible dissolution of unwanted elements of the ingredient. The dilution can be obtained by the combination of water loaded with ingredient extracts and of water that has bypassed the ingredient.

When the permeability value on the top part of the face is lower than the permeability value on the bottom part of the face, then all the water is forced through the ingredient even when the seat is only partly filled with ingredient, e.g. when a capsule is used that is partly filled. In this case, the resulting beverage is more concentrated. To avoid over-extraction when the extraction is an infusion process, e.g. of tea or coffee, the volume of water passed through the ingredient should be limited so that undesired extracted elements are avoided or minimised in the resulting beverage.

Evidently, a same face may be used for a concentrated or a diluted extraction type, or possibly for an intermediate extraction, by changing the position and/or orientation of the face relative to the extraction seat with reference to the machine in its beverage dispensing orientation.

The position and/or orientation of the face relative to the seat may be changed during an extraction of the ingredient in the seat and/or between two consecutive extractions.

The upper portion and the lower portion of the face may make up a total height of the face delimiting the downstream part of the seat. The delimitation line may be located at a height of the face that is in the range of 15% to 85%, such as 30% to 70% e.g. 40 to 60%, of the total height.

The impervious part of at least one of the upper portion and the lower portion may form a continuous flow-inhibiting portion. The flow-inhibiting portion can be configured such that beverage flowing out the seat is inhibited, e.g. prevented, from passing through the flow-inhibiting portion.

The flow-inhibiting portion may have a surface area transverse to the downstream flow direction that is in the range of 25 to 75%, such as 33 to 66% e.g. 40 to 60%, of a surface area transverse to the downstream flow direction of the face.

The flow-inhibiting portion can be an intrinsically closed part formed of a non-pervious part of the face.

Possible details of such a flow-inhibiting portion and of its implementation into the machine are disclosed in co-pending application EP 18214475.8.

The flow-inhibiting portion may be an intrinsically open part of the face, e.g. provided with at least one through hole, that is closed by a sealing arrangement, e.g. a movable temporary sealing arrangement, closing the open part. The sealing arrangement may be located: upstream of the intrinsically open part, e.g. in the seat, and/or downstream of the closed intrinsically open part, typically as an upstream or downstream sheath or plate member; and/or in openings of the intrinsically open part, e.g. as a filling.

The dispensing arrangement may include a flow restricting member arranged relative to the face in a moveable manner between a standard outflow position and a reduced outflow position in which the surface area transverse to the downstream flow direction of the upper and/or lower outflow passages is reduced compared to the standard outflow position by obstructing a part of the upper and/or lower outflow passages. The obstructed upper and/or lower outflow passages may be partly or entirely closed in the reduced position.

The restricting member can have an elastically deformable face configured to control a level of reduction by a pressure applied by the restricting member towards the face.

The restricting member may have one or more projecting members configured to be plugged into the upper and/or lower outflow passages.

The restricting member can have a or the above face that: is delimited by a delimitation such that part of the upper and/or lower outflow passages remains unobstructed in the reduced outflow position; or extends over the entire upper and/or lower outflow passages.

The restricting member may have a plurality of individually positionable distinct parts that are configured each to obstruct only part of the upper and/or lower outflow passages in its reduced outflow position.

The restricting member can have an actuation member that is actuated manually or automatically, e.g. by a motorized actuator.

Possible details of such restricting member(s) and its/their implementation into the machine can be found in co-pending application EP 18214451.9.

The upper portion and the lower portion may be able to take different positions relative to the seat, e.g. pivotable about the downstream flow direction, so as to control a flow path of water through the ingredient when in the seat depending on the position of the flow-through portion.

When the upper portion and the lower portion take a different position, the delimitation line typically follows such position.

The face can be made by a wall forming a beverage guide structure, e.g. a plate-like or sheet-like member, through which the outflow passages extend. At least one of the outflow passages may be formed by at least one of: one or more through holes; a reticulated structure; a foraminate structure; and a porous structure extending through the wall.

The outflow passages may be configured to guide a total flow of beverage from the seat via a total guide entry at a seat side of the wall, through the wall and out of a total guide exit of the wall towards a dispensing area via a beverage outlet, such as a dispensing area delimited by a support for supporting a user-recipient. The wall can be associated with a flow control device configured to control the flow of beverage guided along the outflow passages.

The flow control device may have an obstruction portion, such as a portion that is at least substantially beverage impervious, extending adjacent the wall so as to obstruct at least a portion of the total guide entry and/or exit to prevent or inhibit the passage of beverage through such obstructed guide portion.

The flow control device can have one or more control sides suitable to delimit from the obstruction portion a controlled passage through which is passed a total flow of beverage passing through a non-obstructed portion of the total guide entry and/or exit, the non-obstructed portion may be adjacent the obstructed portion.

The obstruction portion and the control side(s) may be manually and/or automatically operable, e.g. relatively translatable and/or rotatable, over the wall so as to change a relative position and/or a relative size and/or a shape of the obstructed portion and the unobstructed portion of the total guide entry and/or exit. The obstruction portion and the control side(s) may be operable over the wall to be selectively brought into a number of different configurations in terms of relative size and/or relative position and/or shape, for instance a number of at least two, such as in the range of 3 to 30, e.g. 4 to 20 or 5 to 10.

The control side(s) may include at least one of a circular side, a radial or diametral side, and a polygonal side.

The control side(s) can delimit the controlled passage with a cross-section having a shape that is at least one of polygonal, curved e.g. circular, convex and concave, e.g. the shape being a curved or circular sector.

Further possible details of such a flow control device and of its implementation into the machine are described in co-pending application EP 18214459.2.

The extraction seat may be configured for receiving the ingredient capsule that is provided with an outlet membrane. The inlet arrangement may be associated with a piercing and/or cutting arrangement configured to pierce and/or cut water inlet opening(s) into the ingredient capsule in the ingredient extraction seat so that water circulating along the inlet arrangement is passed into the capsule via the water inlet opening. The dispensing arrangement can include one or more piercing and/or cutting elements that project upstream and that are configured for forming beverage outlet orifices in the outlet membrane.

The orifice(s) may be provided in the outlet membrane by the piercing and/or cutting elements: before supplying water into the seat via the inlet arrangement, e.g. the orifice(s) being provided in the membrane at or after insertion of the capsule into the seat; and/or by pressure rise in the capsule caused by supplying water, e.g. at a supply pressure in the range of 5 to 20 bar such as 8 to 15 bar, so as to urge the outlet membrane against the piercing and/or cutting elements.

At least one such piercing and/or cutting element may include a piercing and/or cutting element formed by or fixed to the face, such as a piercing and/or cutting element extending from adjacent the upper or lower outflow passage or a part of such passage. For instance, a plurality of such piercing and/or cutting elements are formed by or fixed to the face.

At least one such piercing and/or cutting element can include a piercing and/or cutting element that is movable through the face, e.g. via a corresponding passage, between: a deployed position in which the movable piercing and/or cutting element extends beyond the face into the seat for providing the orifice in the outlet membrane in the seat by such movable piercing and/or cutting element; and a retracted position in which the piercing and/or cutting element is so retracted relative to its deployed position, e.g. out of the seat, to prevent formation of the orifice in the outlet membrane in the seat by such movable piercing and/or cutting element. Typically, the movable piercing and/or cutting element is fixed to or integral with a support, e.g. a support supporting a plurality of such piercing and/or cutting elements, that is driven by a drive member e.g. actuated by a manual or automatic, e.g. motorized, actuator. The machine may include more than one support supporting one or more piercing and/or cutting elements, the supports being in particular independently actuatable to be able to pierce and/or cut different areas of the outlet membrane to obtain different extractions, as desired. The machine may include an upper support supporting piercing and/or cutting element(s), e.g. associated with the upper portion, and a lower support supporting piercing and/or cutting element(s), e.g. associated with the lower portion.

Possible implementation details of such an arrangement can be found in co-pending application EP18214480.8.

At least one such piercing and/or cutting element may comprise a piercing and/or cutting element associated with an opening control arrangement configured to control the formation of the orifice in the outlet membrane by the above at least one piercing and/or cutting element. The opening control arrangement can include at least one neutralizing member that is movable adjacent the piercing and/or cutting element between an operative position in which the piercing and/or cutting element is prevented from forming the orifice in the outlet membrane and a rest position in which the piercing and/or cutting element is enabled to form the orifice in the outlet membrane. The piercing and/or cutting element may project upstream from the face along an opening direction, e.g. an opening direction substantially parallel to the downstream flow direction, the neutralizing member being movable between its operative and rest positions: at least approximately in parallel to the opening direction; and/or transversally to the opening direction.

Further possible details of an opening control arrangement and its implementation into the machine are disclosed in co-pending application EP 18214470.9.

The extraction seat can be configured for receiving the ingredient capsule that is provided with an outlet membrane. The inlet arrangement may be associated with a piercing and/or cutting arrangement configured to pierce and/or cut water inlet opening(s) into the ingredient capsule in the ingredient extraction seat so that water circulating along the inlet arrangement is passed into the capsule via the water inlet opening. The face may be devoid of any piercing and/or cutting element for piercing and/or cutting the outlet membrane. For instance, beverage outlet orifices are provided in the outlet membrane: prior to receiving the capsule in the extraction seat, e.g. when the capsule is manufactured or subsequently conditioned e.g. in such machine prior to reaching the seat; and/or by being formed by tearing and/or breaking the membrane by pressure rise in the capsule by supply of water into the capsule, for instance to open pre-weakened parts of the membrane and/or actuate a membrane opening element comprised inside the capsule.

Self-opening capsules are for instance disclosed in CH 605 293 and WO 03/059778.

The opening of capsules by a machine's piercing elements of a plate is for example disclosed in EP 512 470 and EP 2 068 684.

Examples of suitable mixing units with mixing chambers are disclosed in WO 2008/037642 and WO 2013/026843.

The face may have a at least approximately disc shape.

At least one of the lower and upper impervious parts may form a circular or annular sector, e.g. generally half disc, such as a circular or annular sector having a circle centre that is at least approximately concentric with the face's circular shape. The circular or annular sector may extend to a circular edge of the face's circular shape. The circular or annular sector can have a central angle in the range of 60 to 300°, such as 90 to 270°, for example 120 to 240°, e.g. 150 to 210°.

At least one of the lower and upper impervious parts can form a disc segment. The disc segment may have a disc centre that is at least approximately concentric with the face's shape. The disc segment and the flow-through portion can have a surface area ratio that is in the range of 0.2 to 5, such as 0.5 to 2, for instance 0.66 to 1.5, e.g. 0.75 to 1.33.

The upper and lower outflow passages may have together a total number of flow-through holes: in the range of 3 to 35, such as 5 to 30, e.g. 10 to 25; and/or each flow-through hole having a minimum diameter transverse to a beverage outflow direction along the hole, in the range of about 0.1 to 1 mm, such as 0.3 to 0.8 mm, e.g. 0.4 to 0.6 mm.

The flow-through holes may have the same dimensions or different dimensions.

The extraction seat may be delimited by a first part and a second part that are relatively movable between: an open position for inserting the ingredient, e.g. within the above capsule, into the extraction seat and/or for removing such ingredient from the seat; and a closed position for extracting in the seat the ingredient.

The first and second parts may be configured such that the first part bears the face and the second part bears the inlet arrangement.

When closed capsules are used, the first and second parts may include a capsule opener such as blades and/or a tearing tool, e.g. a plate with a tearing profile, for instance as known from Nespresso™ machines or as disclosed in EP 0 512 470, EP 2 068 684 and WO 2014/076041 and the references cited therein.

The first and second parts can be configured such that the first and second parts are relatively movable by an actuator such as by a user-handle or by an electric motor, e.g. an actuator connected to at least one of the first and second parts by a transmission such as one or more of gears, belts, cams and cam-followers, levers and/or hydraulic transmissions. Such electric motor may be being controlled by a control unit for controlling the water supply arrangement, such as a unit comprising a processing device e.g. a controller and/or a user interface.

Examples of motors implemented to actuate such first and second parts are disclosed in EP 1767129, WO 2012/025258, WO 2012/025259, WO 2013/127476, WO 2014/056641, WO 2014/096122, WO 2014/096123, WO 2015/155144 and WO 2015/155145.

One of the first and second parts may be stationary relative to an outside machine housing and the other of the first and second parts may be movable relative to the outside machine housing.

Examples of suitable first and second part arrangements are disclosed in WO 2005/004683, WO2007/135136, WO 2009/043630, WO 2017/037212, WO 2017/037215, PCT/EP18/064138 and PCT/EP18/064141.

The inlet arrangement can be fluidically connected to a water supply arrangement via a water guide.

Examples of suitable first and second part arrangements are disclosed in WO 2005/004683, WO2007/135136, WO 2009/043630, WO 2017/037212, WO 2017/037215, PCT/EP18/064138 and PCT/EP18/064141.

The water supply arrangement can include at least one of: a water source for supplying water to the inlet arrangement, such as a water tank and/or a connector to an external water supply line; a water driver for driving water to the inlet arrangement, such as a pump; and a thermal conditioner, e.g. a heater and/or a cooler, for thermally conditioning water supplied or to be supplied to the inlet arrangement, such as a water flow thermal conditioner or a water accumulator thermal conditioner.

The thermal conditioner may be a boiler or a thermoblock or an on demand heater (ODH), for instance an ODH type disclosed in EP 1 253 844, EP 1 380 243 and EP 1 809 151.

Examples of pumps and their incorporation into beverage machines are disclosed in WO 2009/150030, WO 2010/108700, WO 2011/107574 and WO 2013/098173.

The water supply arrangement may be associated with a or the above control unit for controlling the water supply arrangement, such as a unit including a processing device, e.g. a controller and/or a user interface.

The seat may be associated with an un-extracted ingredient insertion passage, e.g. extending from outside such machine, and/or an extracted ingredient evacuation passage, e.g. towards a waste ingredient collector. At least one of the passages may be associated with guides such as rails or grooves, for cooperating with and guiding the abovementioned capsule along the passage to and/or from the seat and/or with a stop for immobilizing the capsule at about a level of the seat.

Examples of waste ingredient collectors are disclosed in EP 1867260, WO 2009/074559, WO 2009/135869, WO 2010/128109, WO 2011/086087, WO 2011/086088, WO 2017/118713, WO 2017/148965 and EP 2018156589.

The insertion passage, when present, may be associated with an ingredient barrier, such as a gate or door or hatch, for selectively allowing and preventing an ingredient pass along the passage. Details of suitable barriers for an ingredient, such as an ingredient supplied within a capsule, are disclosed in WO 2012/126971, WO 2014/056641, WO 2014/056642 and WO 2015/086371.

The interaction between the first and second parts (and optionally the transfer channel) and an ingredient capsule may be of the type disclosed in WO 2005/004683, WO 2007/135135, WO2007/135136, WO 2008/037642 and WO 2013/026856.

When present, the control unit may have a control circuit, e.g. a control circuit for controlling a or the above liquid driver and/or a or the above thermal conditioner. The control circuit may include a micro-controller and/or a microprocessor.

The control unit can comprise an ingredient sensor such as an ingredient capsule sensor.

Details of suitable capsule sensors are disclosed in WO 2012/123440, WO 2014/147128, WO 2015/173285, WO 2015/173289, WO 2015/173292, WO 2016/005352, WO 2016/005417, PCT/EP18/065613, EP3275345 and EP3275346.

The control unit may incorporate a user-interface, such as a user-interface connected to a or the above control circuit. The user-interface may be of the known type, e.g. as disclosed in WO 2010/037806, WO 2011/020779, WO 2016/083485, WO 2017/037215 and PCT/EP18/064138.

The control unit can have a sensor for sensing a presence of a user-recipient, e.g. a cup or mug, in a or the above area to which beverage from the beverage processing line is dispensed. Such a configuration is for instance disclosed in WO 2018/046400.

The invention also relates to a use of an ingredient, such as an ingredient contained in the above mentioned capsule, for extraction in a machine as described above. The ingredient may be selected from at least one of tea, coffee and cacao.

The pressure is typically measured downstream a pump and upstream the water inlet, e.g. in the fluid line between the water inlet and the pump. The pressure in the extraction chamber or in the capsule may possibly be reduced compared to such measured pressure by the presence of a check valve, e.g. at the water inlet of the injection part, and/or restrictions provided in the water inlet of the injection part or by piercing members engaged in the entry wall of the capsule and/or by the ingredient in the capsule and/or other obstacles.

BRIEF DESCRIPTION OF THE DRAWINGS

The invention will now be described with reference to the schematic drawings, wherein.

DETAILED DESCRIPTION

Figure 1:
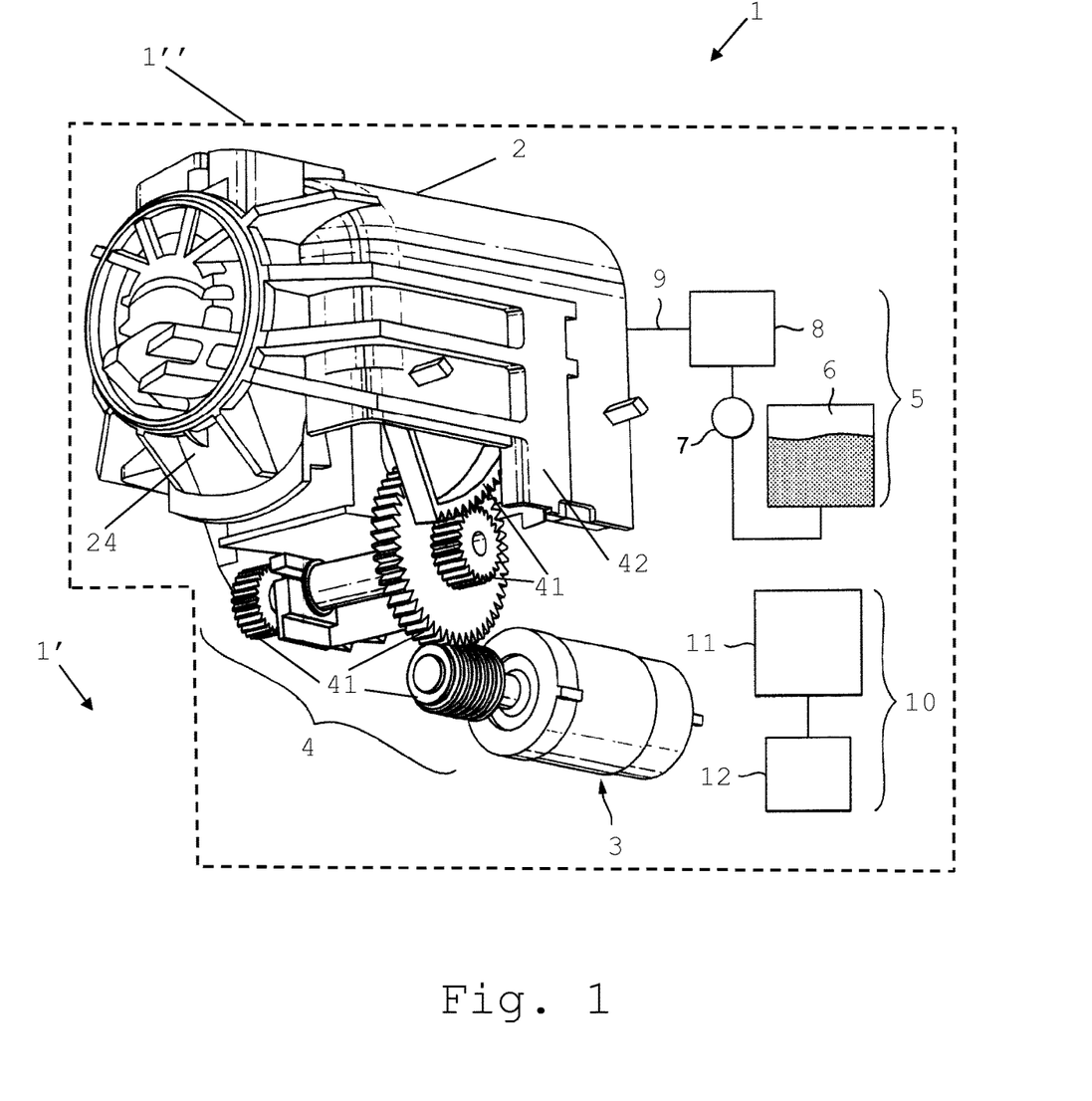
FIG. 1 shows an embodiment of part of a beverage machine according to the invention, part of which being schematically illustrated.
Figure 2:
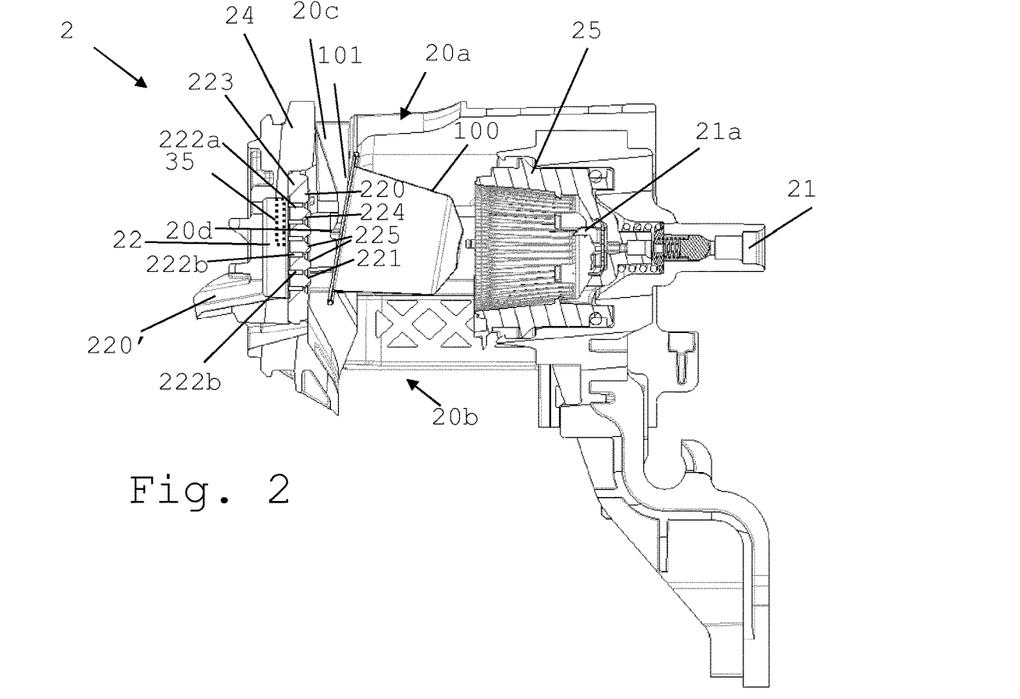
FIG. 2 is a cross-sectional view of an extraction unit of the machine of FIG. 1, an ingredient capsule being in the process of being introduced into the unit's seat.
Figure 3:
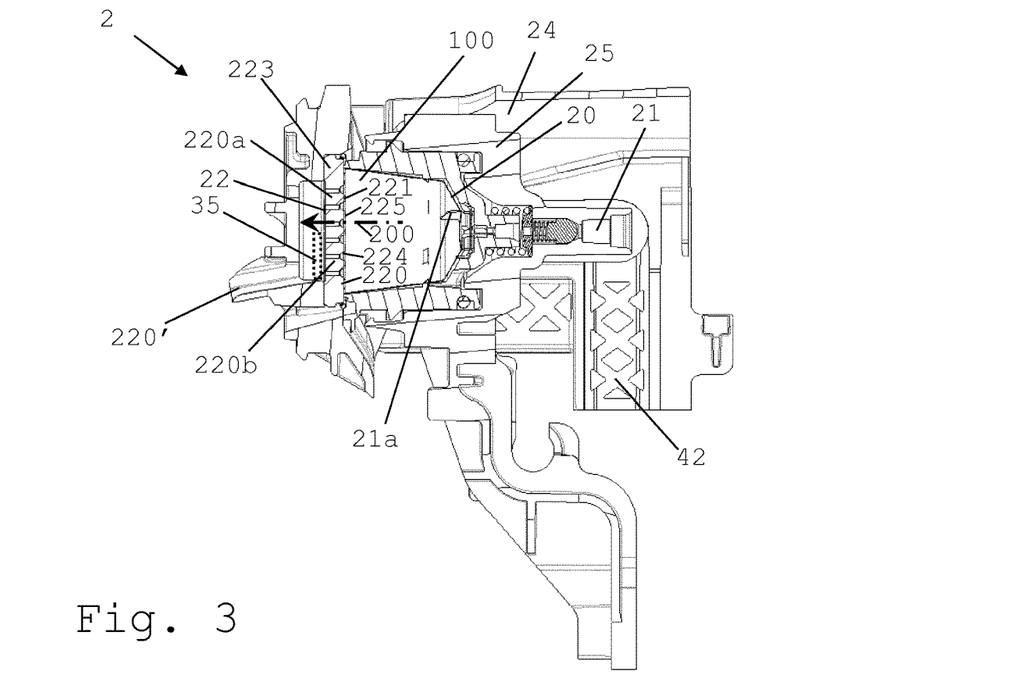
FIG. 3 is a cross-section view of the extraction unit of FIG. 2, the ingredient capsule being in the seat, ready for extraction.

FIGS. 1 to 3 illustrate an exemplary embodiment of a beverage machine 1 for preparing a beverage 110 comprising an extraction unit 2 according to the invention, into which the variations according to the invention illustrated in FIGS. 4 to 22, in which the same numeric references generally designate the same or similar elements and/or the same or similar functionalities, can be implemented.

Extraction unit 2 has an ingredient extraction seat 20, such as a seat delimiting an ingredient chamber and/or a seat 20 for receiving an ingredient 102 supplied within a capsule 100 into the seat 20. Extraction unit 2 has an inlet arrangement 21 for guiding water into seat 20. Extraction unit 2 includes a dispensing arrangement 22 for guiding beverage 110 out of seat 20, dispensing arrangement 22 having a face 220 delimiting a downstream part of seat 20.

Face 220 is made of an upper portion 220a and a lower portion 220b. Such portions 220a,220b are delimited by a substantially horizontal physical or notional delimitation line 220c that is located between a top end and a bottom end of face 220. Upper and lower portions 220a,220b are typically at least substantially flush. For instance, portions 220a,220b extend in the same plane or are substantially parallel and slightly offset, e.g. by a distance that does not exceed 2 or 3 or 4 mm.

Upper portion 220a is made of an upper outflow passage 222a and an upper impervious part delimiting upper outflow passage 222a. Upper portion 220a has an upper surface area ratio transverse to a direction 200 of downstream flow in seat 20 of: a surface area of upper outflow passage 222a over a surface area of the upper impervious part.

Lower portion 220b is made of a lower outflow passage 222b and a lower impervious part delimiting the lower outflow passage. Lower portion 220b has a lower surface area ratio transverse to downstream flow direction 200 of: a surface area of the lower outflow passage 222b over a surface area of the lower impervious part.

Face 220 has an overall ratio of the upper surface area ratio (e.g. the upper permeability value) over the lower surface area ratio (e.g. the lower permeability value) that is greater or smaller than 1, such as greater than 3 or smaller than 0.3, for instance greater than 10 or smaller than 0.1, e.g. greater than 100 or smaller than 0.01.

Figure 11:
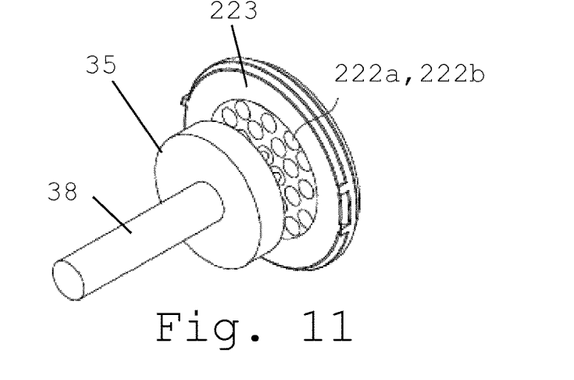
FIGS. 11 and 12 illustrate the restricting members in combination with the upper and lower outflow passages, a restricting member being shown in the standard outflow position in FIG. 11 and a restricting member being shown in the reduced outflow position in FIG. 12.
Figure 20:
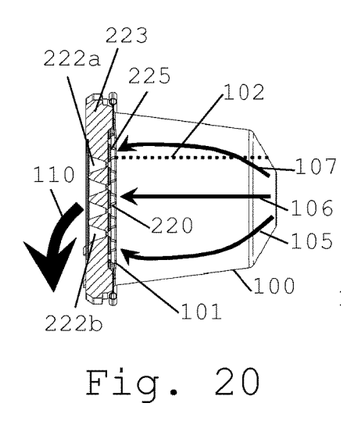
FIG. 20 schematically illustrates a configuration of a water flow through an ingredient in the machine's seat in which the face's upper permeability value is equal to the face's lower permeability value.

In FIG. 20, a flow of water 105,106,107 through seat 20, e.g. through capsule 100 partly filled with ingredient 102 (up to the doted level in the Figure), is illustrated where face 220 has an overall ratio of the upper surface area ratio over the lower surface area ratio of 1. Such a flow is known from state of the art machines of from a machine according to the invention operating in a state of the art extraction mode, e.g. as illustrated in FIG. 11 (flow restricting member 35 in the standard outflow position). No preferential flow is generated due to the upper and lower permeability values that are the same, which leads to an average extraction and an average resulting beverage 110.

Figure 21:
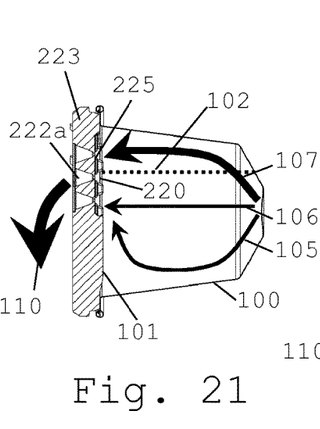
FIG. 21 schematically illustrates a configuration of a water flow through an ingredient in the machine's seat in which the face's upper permeability value is greater than the face's lower permeability value.
Figure 22:
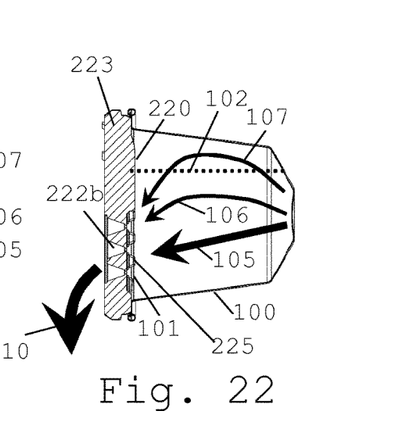
FIG. 22 schematically illustrates a configuration of a water flow through an ingredient in the machine's seat in which the face's lower permeability value is greater than the face's upper permeability value.

When the upper surface area ratio of the upper potion 220a of face 220 is greater than the lower surface area ratio of face 200, an upper flow 107 of water is favoured on the upper part of seat 200, the flow of water 105,106 being also present (although at a reduced rate) in the lower part of seat 200 due to the pressure of the water feed into seat 20, as illustrated in FIG. 21. If seat 20 is only partly filled with ingredient 102, e.g. when a capsule 100 is used that is partly filled, then upper part 107 of water flowing through seat 20 is not or only poorly exposed to ingredient 102 contained in seat 20. Hence, the resulting beverage 110 is less concentrated. Moreover, when the extraction is an infusion process, e.g. of tea or coffee 102, then the dilution of beverage 110 does not require a depletion (over-extraction) of ingredient 102 with the possible dissolution of unwanted elements of ingredient. The dilution can be obtained by the combination of water 105,106 loaded with ingredient extracts and of water 107 that has (at least substantially) bypassed ingredient 102. With such a configuration, high quality lungo or Americano coffees can be obtained.

When the upper surface area ratio of upper portion 220a of face 220 is lower than the lower surface area ratio of lower portion 220b of face 220, then substantially all the water 105,106,107 is forced through ingredient 102 even when seat 20 is only partly filled with ingredient 102, e.g. when a capsule 100 is used that is partly filled. See FIG. 22. In this case, resulting beverage 110 is more concentrated. To avoid over-extraction when the extraction is an infusion process, e.g. of tea or coffee 105, the volume of water 105,106,107 passed through ingredient 102 should be limited so that undesired extracted elements are avoided or minimised in the resulting beverage 110. With such a configuration, high quality espresso or ristretto coffees can be obtained.

Evidently, a same face 220 may be used for a concentrated or a diluted extraction type, or possibly for an intermediate extraction, by changing the position and/or orientation of face 220 relative to extraction seat 20 with reference to machine 1 in its beverage dispensing orientation.

The position and/or orientation of face 220 relative to seat 20 may be changed during an extraction of ingredient 102 in seat 20 and/or between two consecutive extractions.

Upper portion 220a and lower portion 220b of face 220 may make up a total height of face 220 delimiting the downstream part of the seat. Delimitation line 220c may be located at a height of face 220 that is in the range of 15% to 85%, such as 30% to 70% e.g. 40 to 60%, of the total height.

The impervious part of at least one of upper portion 220a and lower portion 220b can form a continuous flow-inhibiting portion. Such flow-inhibiting portion may be configured such that beverage 110 flowing out seat 20 is inhibited, e.g. prevented, from passing through the flow-inhibiting portion. See FIG. 4.

Figure 4:
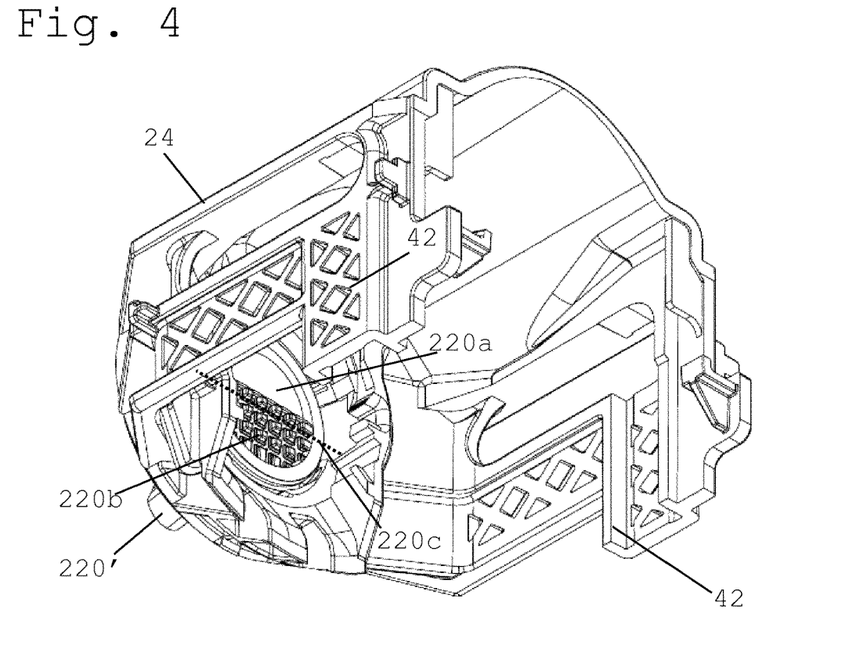
FIGS. 4 to 6 illustrate an example of implementation according to the invention of the extraction unit's downstream part with a particular seat delimitation face that has an upper portion with a lower permeability and a lower portion with a higher permeability, the face being rotated upside down, piercing and/or cutting elements being formed by or fixed to the face.
Figure 5:
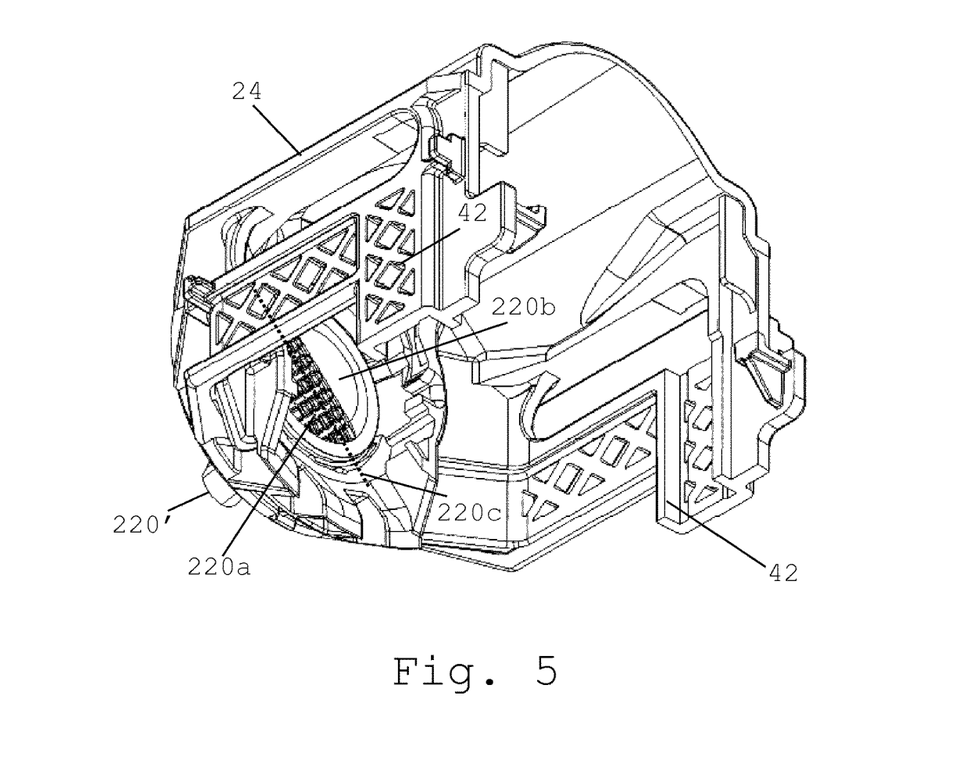
Figure 6:
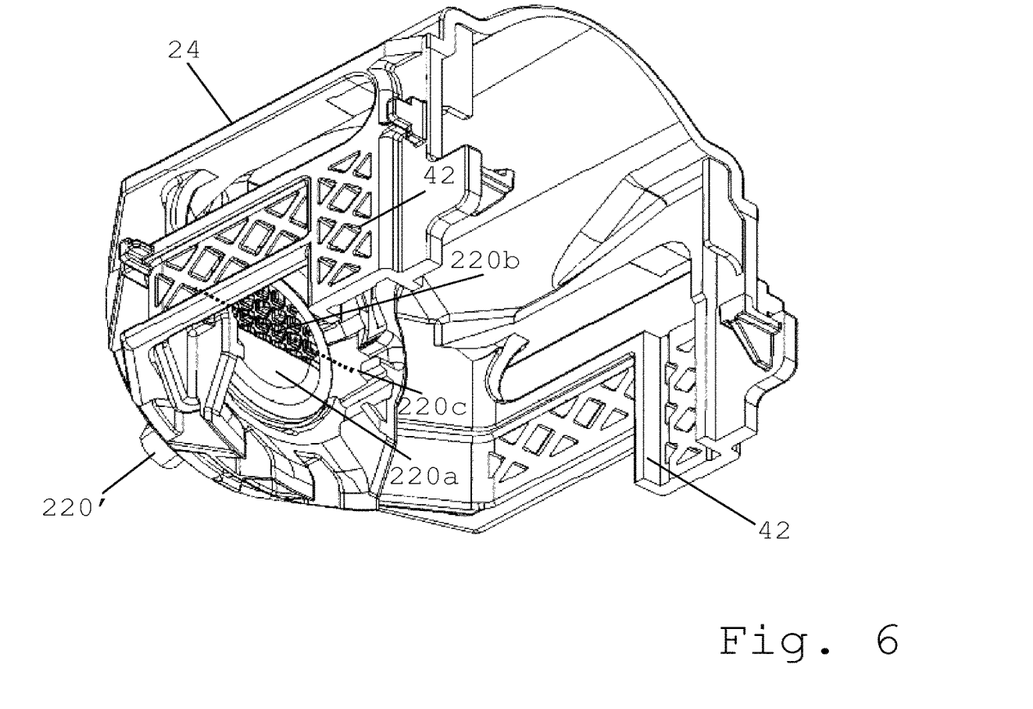

The flow-inhibiting portion can having a surface area transverse to downstream flow direction 200 that is in the range of 25 to 75%, such as 33 to 66% e.g. 40 to 60%, of a surface area transverse to downstream flow direction 200 of the face 220.

The flow-inhibiting portion may be an intrinsically closed part formed of a non-pervious part of face 220.

The flow-inhibiting portion can be an intrinsically open part of face 220, e.g. provided with at least one through hole 222a,222b, that is closed by a sealing arrangement 35, e.g. a movable temporary sealing arrangement 35, closing the open part. For instance, sealing arrangement 35 is located: upstream of the intrinsically open part, e.g. in seat 20, and/or downstream of the closed intrinsically open part typically as an upstream or downstream sheath or plate member; and/or in openings of the intrinsically open part, e.g. as a filling.

Dispensing arrangement 22 may include a flow restricting member 35, as illustrated schematically in FIGS. 2 and 3 and shown in FIGS. 9 to 12, arranged relative to face 220 in a moveable manner between a standard outflow position and a reduced outflow position in which the surface area transverse to downstream flow direction 200 of the upper and/or lower outflow passages 222a,222b is reduced compared to the standard outflow position. The reduction being obtained by obstructing a part of the upper and/or lower outflow passages 222a,222b. The obstructed upper and/or lower outflow passages 222a,222b may be partly or entirely closed in the reduced position.

Restricting member 35 may have an elastically deformable face 36 configured to control a level of reduction by a pressure applied by restricting member 35 towards face 220. See FIG. 9.

Restricting member 35 can have one or more projecting members 37 configured to be plugged into the upper and/or lower outflow passages 222a,222b. See FIG. 10.

Figure 10:
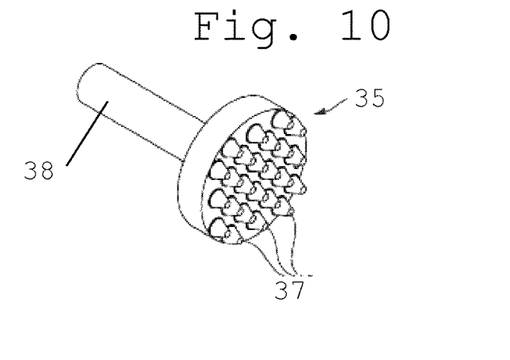
Figure 12:
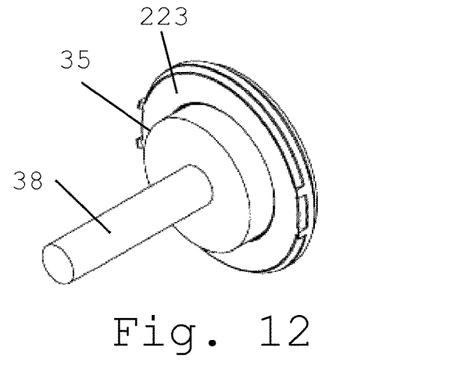

Restricting member 35 may have a or the above face 36: that is delimited by a delimitation 37 (e.g. a cut-out) such that part of the upper and/or lower outflow passages 222a, 222b remains unobstructed in the reduced outflow position (FIG. 9); or that extends over the entire upper and/or lower outflow passages 222a,222b (FIGS. 10 to 12).

Restricting member 35 can have a plurality of individually positionable distinct parts that are configured each to obstruct only part of the upper and/or lower outflow passages 222a,222b in its reduced outflow position.

Restricting member 35 may have an actuation member 38 that is actuated manually or automatically, e.g. by a motorized actuator.

Upper portion 220a and lower portion 220b may be able to take different positions relative to seat 20, e.g. pivotable about the downstream flow direction 200, so as to control a flow path of water through the ingredient 102 when in seat 20 depending on the position of flow-through portion 221. See FIGS. 4 to 6.

Face 220 can be made by a wall 223 forming a beverage guide structure, e.g. a plate-like or sheet-like member 223, through which outflow passages 222a,222b extend. At least one of the outflow passages 222a,222b may be formed by at least one of: one or more through holes; a reticulated structure; a foraminate structure; and a porous structure extending through wall 223.

Outflow passages 222a,222b may be configured to guide a total flow of beverage 110 from seat 20 via a total guide entry at a seat side of wall 223, through wall 223 and out of a total guide exit of wall 223 towards a dispensing area 1' via a beverage outlet 220'. Dispensing area 1' can be delimited by a support for supporting a user-recipient.

Wall 223 may be associated with a flow control device 23a,23b configured to control the flow of beverage 110 guided along outflow passages 222a,222b. See FIGS. 13 and 14.

Figure 13:
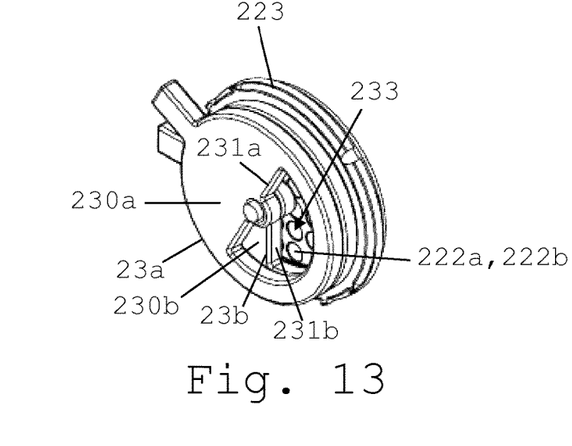
FIGS. 13 and 14 illustrate yet another implementing example of part of a dispensing arrangement, namely a flow control device that is configured to control the flow or beverage guided along the outflow passages, the flow control device being shown in a relative arrangement of minimum obstruction in FIG. 14 and of intermediate obstruction in FIG. 13.
Figure 14:
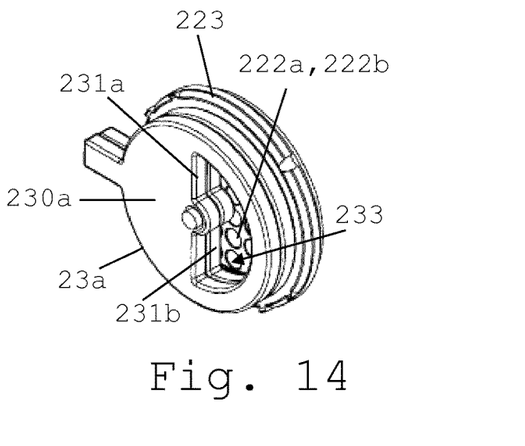
Figure 15:
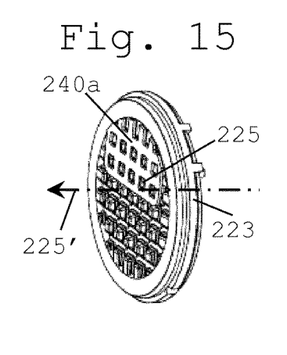
FIGS. 15 to 17 illustrate yet a further implementation example of part of a dispensing arrangement, namely a face with piercing and/or cutting elements that are associated with an opening control arrangement that is in its rest position in FIG. 16, in its operative position in FIG. 15 and shown as such in FIG. 17.
Figure 16:
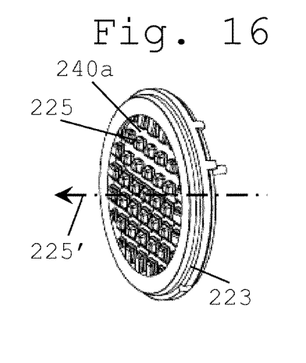
Figure 17:
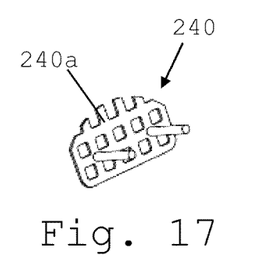

Flow control device 23a,23b may have an obstruction portion 230a,230b, such as a portion that is at least substantially beverage impervious, extending adjacent wall 223 so as to obstruct at least a portion of the total guide entry and/or exit to prevent or inhibit the passage of beverage 110 through such obstructed guide portion. Flow control device 23a,23b can have one or more control sides 231a,231b suitable to delimit from obstruction portion 230a,230b a controlled passage 233 through which is passed the total flow of beverage 110 passing through a non-obstructed portion of the total guide entry and/or exit, the non-obstructed portion being adjacent obstructed portion 230a, 230b.

Obstruction portion 230a,230b and control side(s) 231a, 231b may be manually and/or automatically operable, e.g. relatively translatable and/or rotatable, over wall 223 so as to change a relative position and/or a relative size and/or a shape of the obstructed portion and the unobstructed portion of the total guide entry and/or exit, such as operable over wall 223 to be selectively brought into a number of different configurations in terms of relative size and/or relative position and/or shape, for instance a number of at least two, such as in the range of 3 to 30, e.g. 4 to 20 or 5 to 10.

Control side(s) 231a,231b may include at least one of a circular side, a radial or diametral side, and a polygonal side.

Control side(s) 231a,231b can delimit controlled passage 233 with a cross-section having a shape that is at least one of polygonal, curved e.g. circular, convex and concave, e.g. the shape being a curved or circular sector.

Extraction seat 20 may be configured for receiving ingredient capsule 100 that is provided with an outlet membrane 101. For instance, inlet arrangement 21 is associated with a piercing and/or cutting arrangement 21a configured to pierce and/or cut water inlet opening(s) into ingredient capsule 100 in ingredient extraction seat 20 so that water circulating along the inlet arrangement is passed into capsule 100 via the water inlet opening.

Dispensing arrangement 22 may include one or more piercing and/or cutting elements 225,33 that project upstream and that are configured for forming beverage outlet orifices in outlet membrane 101.

Such orifice(s) may be provided in outlet membrane 101 by piercing and/or cutting elements 225,33: before supplying water into seat 20 via the inlet arrangement 21, e.g. the orifice(s) being provided in outlet membrane 101 at or after insertion of the capsule into the seat 20; and/or by pressure rise in capsule 100 caused by supplying water, e.g. at a supply pressure in the range of 5 to 20 bar such as 8 to 15 bar, so as to urge outlet membrane 101 against elements 225,33.

At least one such piercing and/or cutting element 225,33 may include a piercing and/or cutting element 225 formed by or fixed to face 220, such as an element 225 extending from adjacent the upper or lower outflow passage 222a,222b or a part of such passage.

For instance, a plurality of such piercing and/or cutting elements 225 are formed by or fixed to face 220. See FIGS. 2 to 8 and 17 to 19.

Figure 7:
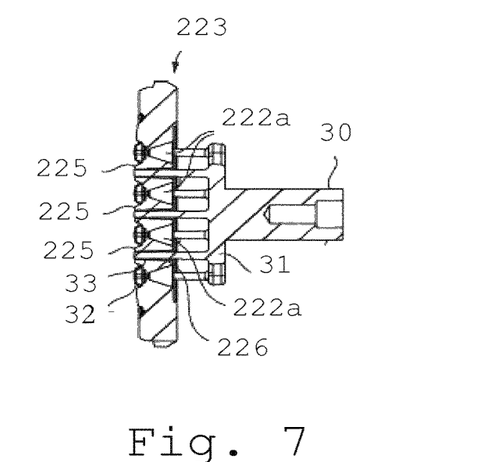
FIGS. 7 and 8 are horizontal cross-sectional plan views (from above) of another implementing example of a seat's delimitating face in which piercing and/or cutting elements are moveable through the face, the face being also provided with further piercing and/or cutting elements that are formed by or fixed to the face.

At least one such piercing and/or cutting element 225,33 can include a piercing and/or cutting element 33 that is movable through face 220, e.g. via a corresponding passage 32, between: a deployed position in which movable piercing and/or cutting element 33 extends beyond face 220 into seat 20 for providing the orifice in outlet membrane 101 in seat 20 by such movable piercing and/or cutting element 33 (FIG. 8); and a retracted position in which element 33 is so retracted relative to its deployed position, e.g. out of seat 20, to prevent formation of the orifice in outlet membrane 101 in seat 20 by such movable piercing and/or cutting element 33 (FIG. 7).

Figure 8:
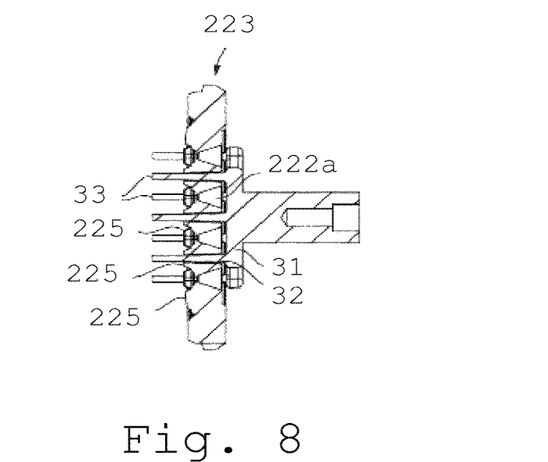
Figure 9:
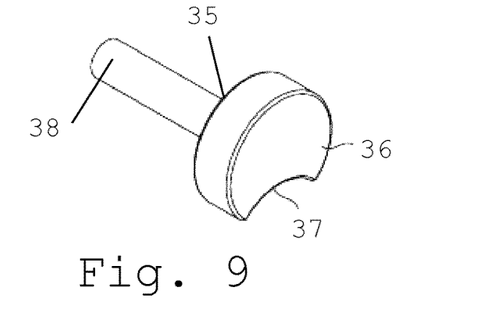
FIGS. 9 and 10 illustrate further implementing examples of part of a dispensing arrangement, namely restricting members that are shaped to fully (FIG. 10) or partly (FIG. 9) close the upper and lower outflow passages.

Typically movable piercing and/or cutting element 33 is fixed to or integral with a support 31, e.g. a support supporting a plurality of such piercing and/or cutting elements 33, that is driven by a drive member 30 e.g. actuated by a manual or automatic, e.g. motorized, actuator. Machine 1 may include more than one support 31 supporting one or more piercing and/or cutting elements 33, the supports being in particular independently actuatable to be able to pierce and/or cut different areas of the outlet membrane to obtain different extractions, as desired. Machine 1 may include an upper support 31 supporting piercing and/or cutting element(s) 33, e.g. associated with upper portion 220a, and a lower support 31 supporting piercing and/or cutting element(s) 33, e.g. associated with lower portion 220b.

At least one such piercing and/or cutting element 225,33 may include a piercing and/or cutting element 225 associated with an opening control arrangement 240 configured to control the formation of the orifice in the outlet membrane 101 by at least one piercing and/or cutting element 225. Opening control arrangement 240 may include at least one neutralizing member 240a that is movable adjacent piercing and/or cutting element 225 between an operative position in which piercing and/or cutting element 225 is prevented from forming the orifice in outlet membrane 101 and a rest position in which piercing and/or cutting element 225 is enabled to form the orifice in outlet membrane 101. For instance, piercing and/or cutting element 225 projects upstream from face 220 along an opening direction 225', e.g. an opening direction substantially parallel to downstream flow direction 200, neutralizing member 240 being movable between its operative and rest positions: at least approximately in parallel to opening direction 225'; and/or transversally to opening direction 225'. See FIGS. 15 to 17.

The extraction seat can be configured for receiving an ingredient capsule that is provided with an outlet membrane, optionally the inlet arrangement being associated with a piercing and/or cutting arrangement configured to pierce and/or cut water inlet opening(s) into the ingredient capsule in the ingredient extraction seat so that water circulating along the inlet arrangement is passed into the capsule via the water inlet opening. The face delimiting the seat may be devoid of any piercing and/or cutting element for piercing and/or cutting the outlet membrane. Beverage outlet orifices may be provided in the outlet membrane: prior to receiving the capsule in the extraction seat, e.g. when the capsule is manufactured or subsequently conditioned e.g. in such machine prior to reaching the seat; and/or by being formed by tearing and/or breaking the membrane by pressure rise in the capsule by supply of water into the capsule, for instance to open pre-weakened parts of the membrane and/or actuate a membrane opening element comprised inside the capsule.

Face 220 can have a at least approximately disc shape. See FIGS. 4 to 6 and 11 to 19. At least one of the lower and upper impervious parts may form:
  a circular or annular sector, e.g. generally half disc, such as a circular or annular sector having a circle centre that is at least approximately concentric with the face's circular shape, optionally the circular or annular sector extending to a circular edge of the face's circular shape, for instance the circular or annular sector having a central angle in the range of 60 to 300°, such as 90 to 270°, for example 120 to 240°, e.g. 150 to 210°; or
  a disc segment, optionally: the disc segment having a disc centre that is at least approximately concentric with the face's shape; and/or the disc segment and the flow-through portion having a surface area ratio that is in the range of 0.2 to 5, such as 0.5 to 2, for instance 0.66 to 1.5, e.g. 0.75 to 1.33.

The upper and lower outflow passages 222a,222b can have together a total number of flow-through holes 222a, 222b: in the range of 3 to 35, such as 5 to 30, e.g. 10 to 25; and/or each flow-through hole 222a,222b having a minimum diameter transverse to a beverage outflow direction along the hole, in the range of about 0.1 to 1 mm, such as 0.3 to 0.8 mm, e.g. 0.4 to 0.6 mm. See FIGS. 2, 3, 11, 19.

Figure 18:
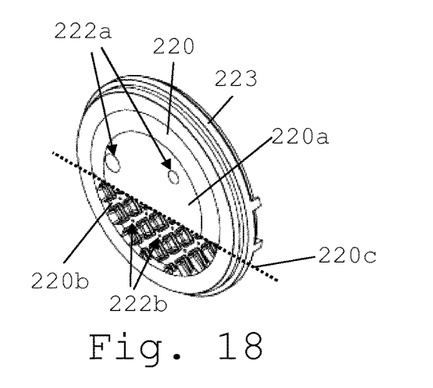
FIGS. 18 and 19 illustrate further implementing examples of a seat's delimitating face in which piercing and/or cutting elements are provided on the lower portion, outflow passages being provided on the lower and upper portions in different sizes and numbers in FIG. 18 and different numbers in FIG. 19.
Figure 19:
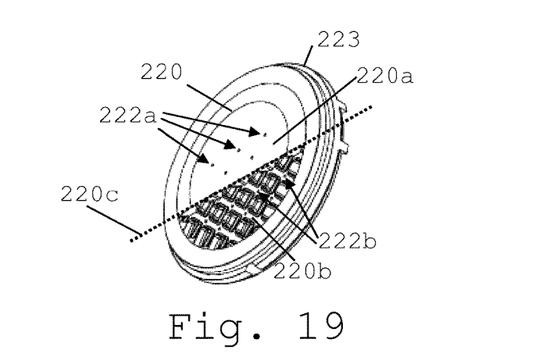

Flow-through holes 222a,222b may all have the same dimensions (FIG. 19) or may be of different dimensions (FIG. 18).

Extraction seat 20 may be delimited by a first part 24 and a second part 25 that are relatively movable between: an open position for inserting ingredient 102, e.g. within the above capsule 100, into the extraction seat 20 and/or for removing such ingredient 102 from seat 20; and a closed position for extracting in seat 20 ingredient 102. See FIGS. 2 and 3.

First and second parts 24,25 may be configured such that first part 24 bears face 220 and second part 25 bears inlet arrangement 21.

First and second parts 24,25 can be configured such that first and second parts 24,25 are relatively movable by an actuator such as by a user-handle or by an electric motor 3, e.g. an actuator connected to at least one of first and second parts 24,25 by a transmission 4 such as one or more of gears 41, belts, cams 42 and cam-followers, levers and/or hydraulic transmissions. For instance, electric motor 3 is controlled by a control unit 10 for controlling water supply arrangement 5, such as a unit 10 having a processing device e.g. a controller 11 and/or a user interface 12.

First and second parts 24,25 may be configured such that one of first and second parts 24,25 is stationary relative to an outside machine housing 1" and the other of first and second parts 24,25 is movable relative to outside machine housing 1".

Inlet arrangement 21 may be fluidically connected to a water supply arrangement 5 via a water guide 9.

Water supply arrangement 5 may include at least one of: a water source 6 for supplying water to inlet arrangement 21, such as a water tank and/or a connector to an external water supply line; a water driver 7 for driving water to the inlet arrangement 21, such as a pump; and a thermal conditioner 8, e.g. a heater and/or a cooler, for thermally conditioning water supplied or to be supplied to inlet arrangement 21, such as a water flow thermal conditioner or a water accumulator thermal conditioner.

Water supply arrangement 5 can be associated with a or the above control unit 10 for controlling water supply arrangement 5, such as a unit 10 comprising a processing device e.g. a controller 11 and/or a user interface 12.

Seat 20 may be associated with an un-extracted ingredient insertion passage 20a, e.g. extending from outside such machine 1, and/or an extracted ingredient evacuation passage 20b, e.g. towards a waste ingredient collector. Passage(s) 20a,20b may be associated with guides 20c, such as rails or grooves, for cooperating with and guiding capsule 100 along the passage to and/or from seat 20 and/or with a stop 20d for immobilizing such capsule 100 at about a level of seat 20.

The invention claimed is:

1. A method for extracting an ingredient from a capsule using a machine for preparing a beverage from the ingredient, the machine comprising an extraction unit that has:
    an ingredient extraction seat;
    an inlet arrangement configured for guiding water into the ingredient extraction seat; and
    a dispensing arrangement configured for guiding beverage out of the ingredient extraction seat, the dispensing arrangement comprising a face defining a downstream part of the ingredient extraction seat,
    the face being made of an upper portion and a lower portion, the upper portion and the lower portion are delimited by a substantially horizontal physical or notional delimitation line that is located between a top end and a bottom end of the face, the upper portion and the lower portion being at least substantially flush,
    the upper portion being made of an upper outflow passage and an upper impervious part defining the upper outflow passage, the upper portion having an upper surface area ratio transverse to a direction of downstream flow in the ingredient extraction seat, the upper surface area ratio comprising a surface area of the upper outflow passage over a surface area of the upper impervious part,
    the lower portion being made of a lower outflow passage and a lower impervious part delimiting the lower outflow passage, the lower portion having a lower surface area ratio transverse to the downstream flow direction, the lower surface area ratio comprising a surface area of the lower outflow passage over a surface area of the lower impervious part,
    the face has an overall ratio of the upper surface area ratio over the lower surface area ratio that is greater than 3 or smaller than 0.3;
    the method comprising:
        receiving an ingredient supplied within a capsule in the ingredient extraction seat;
        guiding the water into the ingredient extraction seat; and
        guiding the beverage out of the ingredient extraction seat,
    wherein the dispensing arrangement comprises a flow restricting member arranged relative to the face, the method comprising moving the flow restricting member between a standard outflow position and a reduced outflow position, the reduced outflow position reducing the surface area transverse to the downstream flow direction of the upper outflow passage, the upper outflow passage being reduced compared to the lower outflow passage position by obstructing a part of the upper outflow passage or the lower outflow passage, the lower outflow passage being reduced compared to the upper outflow passage position by obstructing a part of the lower outflow passage, the part of the upper outflow passage and/or the lower outflow passage being partly or entirely closed in the reduced position.

2. The method of claim 1, wherein the ingredient extraction seat defines an ingredient chamber and/or is configured for receiving the ingredient supplied within the capsule into the ingredient extraction seat.

3. The method of claim 1, comprising forming an orifice in an outlet membrane of the capsule, by a piercing and/or cutting element.

4. The method of claim 3, comprising controlling the formation of the orifice in the outlet membrane of the capsule by the piercing and/or cutting element associated with an opening control arrangement.

5. The method of claim 4, wherein the opening control arrangement comprises a neutralizing member, and the method comprises moving the neutralizing member between an operative position in which the piercing and/or cutting element is prevented from forming the orifice in the outlet membrane and a rest position in which the piercing and/or cutting element is enabled to form the orifice in the outlet membrane.

6. The method of claim 5, wherein the piercing and/or cutting element projects upstream from the face along an opening direction, and the neutralizing member moves between the operative and rest positions parallel to the opening direction and/or transversally to the opening direction.

7. The method of claim 6, wherein the opening direction is parallel to the downstream flow direction.

8. The method of claim 1, the substantially horizontal physical or notional delimitation line being located at a height of the face is in the range of 30% to 70% of the total height of the face.

9. The method of claim 1, wherein the upper and lower outflow passages are configured to guide a total flow of beverage from the ingredient extraction seat via a total guide entry at a seat side of a wall, through the wall, and out of a total guide exit of the wall towards a dispensing area via a beverage outlet, the wall being associated with a flow control device configured to control the flow of beverage guided along the upper and lower outflow passages, the flow control device having:

an obstruction portion; and one or more control sides suitable to delimit from the obstruction portion a controlled passage through which is passed the total flow of beverage passing through a non-obstructed portion of the total guide entry and/or exit, the non-obstructed portion being adjacent the obstructed portion, the method comprising manually and/or automatically operating the obstruction portion and the one or more control sides over the wall to change a relative position and/or a relative size and/or a shape of the obstructed portion and the unobstructed portion of the total guide entry and/or the total guide exit.

10. The method of claim 1, wherein the substantially horizontal physical or notional delimitation line being located at a height of the face is in the range of 40% to 60% of the total height of the face.

\* \* \* \* \*